(12) United States Patent
Bowyer et al.

(10) Patent No.: US 6,313,874 B1
(45) Date of Patent: Nov. 6, 2001

(54) METHOD AND APPARATUS FOR DIRECT DETECTION OF COMMUNICATION SYSTEM LEAKAGE SIGNALS

(75) Inventors: Andrew E. Bowyer, Indianapolis; Daniel K. Chappell, Fishers, both of IN (US)

(73) Assignee: Wavetek Corporation, Indianapolis, IN (US)

( * ) Notice: Subject to any disclaimer, the term of this patent is extended or adjusted under 35 U.S.C. 154(b) by 0 days.

(21) Appl. No.: 08/971,906

(22) Filed: Nov. 17, 1997

(51) Int. Cl.$^7$ ............ H04N 17/02; H04N 5/455; H04N 5/50; H04B 17/00; G01R 23/04

(52) U.S. Cl. ............ 348/180; 348/180; 348/192; 348/726; 348/731; 455/67.3; 455/324; 324/95

(58) Field of Search .................. 348/2, 4, 5, 6, 348/180, 192, 726, 731; 455/2, 67.3, 324; 324/95, 529, 530, 627; 343/703; 340/600; 331/2, 16; 375/224

(56) References Cited

U.S. PATENT DOCUMENTS

| | | | |
|---|---|---|---|
| 3,153,192 | * | 10/1964 | Pidhayny et al. . |
| 3,631,346 | * | 12/1971 | Riggs ................... 325/363 |
| 4,085,388 | * | 4/1978 | Gilden et al. ................. 331/107 |
| 4,570,125 | * | 2/1986 | Gibson ........................ 329/50 |
| 5,025,209 | * | 6/1991 | Danzeisen ................... 324/77 |
| 5,230,099 | * | 7/1993 | Loper ........................ 455/324 |
| 5,465,112 | * | 11/1995 | Nakao ........................ 348/4 |
| 5,477,150 | * | 12/1995 | Ham, Jr. et al. ............. 324/536 |
| 5,493,210 | * | 2/1996 | Orndorff et al. ............. 324/95 |
| 5,633,582 | * | 5/1997 | Orndorff et al. ............. 324/95 |
| 5,640,697 | * | 6/1997 | Orndorff ..................... 455/315 |
| 5,656,929 | * | 8/1997 | Humpherys .................. 324/95 |
| 5,777,662 | * | 7/1998 | Zimmerman ................... 348/6 |
| 5,847,612 | * | 12/1998 | Birleson ..................... 331/2 |
| 5,913,159 | * | 6/1999 | Muirhead et al. .............. 455/226.4 |
| 5,914,608 | * | 6/1999 | Wissman et al. .............. 324/522 |
| 5,982,165 | * | 11/1999 | Bowyer et al. ............... 324/95 |
| 6,011,816 | * | 1/2000 | Sanielevici et al. .......... 375/324 |
| 6,018,553 | * | 1/2000 | Sanielevici et al. .......... 375/334 |
| 6,072,997 | * | 6/2000 | Kawai ........................ 455/214 |

* cited by examiner

Primary Examiner—Reinhard J. Eisenzopf
Assistant Examiner—Paula Natrael
(74) Attorney, Agent, or Firm—Maginot, Addison & Moore (57) ABSTRACT

A receiver circuit, which may be used in a leakage detector, includes an RF input, a narrow band filter, and a direct demodulator. The leakage detector in which the receiver circuit may be used is operable to measure leakage in a communication system, the communication system operable to transmit broadband communication signals comprising one or more radio frequency carrier signals modulated by one or more baseband communication signals, wherein each radio frequency carrier signal has a channel frequency. Essentially, the exemplary receiver circuit according to the present invention is operable to generate a baseband leakage signal. To this end, the RF input is coupled to a source of broadband communication signals and receives a broadband communication signal therefrom, the broadband communication signal including a first signal associated with a first channel frequency. The narrow band filter is operably coupled to the RF input to receive at least a portion of the broadband communication signal and producing a filtered first signal therefrom, the narrow band filter having a Q value at least on the order of 1000 and further having a pass band that includes the first channel frequency. The direct demodulator is coupled to the narrow band filter, and is operable to generate a baseband leakage signal from the filtered first signal.

26 Claims, 3 Drawing Sheets

METHOD AND APPARATUS FOR DIRECT DETECTION OF COMMUNICATION SYSTEM LEAKAGE SIGNALS

FIELD OF THE INVENTION

The present invention relates generally to communication system testing, and more particularly, to the measurement of leakage signals in a communication system.

BACKGROUND OF THE INVENTION

A Community Antenna Television ("CATV") system, or cable television system, includes at its basic elements a centralized transmitter and a distribution network. The centralized transmitter typically includes an aerial antenna for receiving radio frequency ("RF") television signals. The centralized transmitter is further connected to communicate television signals to CATV subscribers through the distribution network. The distribution network includes an array of coaxial cable, repeater amplifiers, and other devices that often connect as many as hundreds of thousands of subscribers to the centralized transmitter. The complexity and size of the distribution network require that network operation and performance be periodically tested and/or monitored.

One test often performed by CATV service providers is leakage detection. Leakage detection is an operation which measures the leakage of CATV signals to the exterior of the distribution network. CATV signal leakage occurs in faults or anomalies within the distribution network. For example, if a portion of the coaxial cable is insufficiently shielded, then significant levels of CATV signals may leak to the environment surrounding the cable. Government regulations limit the amount of permissible CATV signal leakage. Accordingly, service providers employ leakage detection to determine compliance with government regulations and otherwise obtain information as to the performance of the distribution network.

A common method of leakage detection consists of physically scanning the distribution network with a portable leakage detector. Specifically, a technician drives or walks along the route of the distribution network with an activated portable leakage detector. The leakage detector, which includes an RF receiver, measures the level of RF signals within the CATV spectrum and provides an indication of that level to the technician. Accordingly, if a technician passes by a portion of the distribution network in which a leak is present, a relatively high signal level will be measured.

A number of leakage detection devices are presently known. In connection with industry and regulatory standards, such devices typically are tuned to detect and/or measure leakage signals in the frequency range that overlaps with frequencies allocated for aeronautical use. Specifically, a typical leakage detector is tuned to receive a select television signal having a CATV channel frequency of between 115 MHz and 140 MHz. In order to distinguish leaked CATV signals from other sources of RF energy, the leakage detection device measures energy in an extremely narrow band around the CATV channel frequency. Such a measurement has a higher probability of being representative of actual CATV leakage signals, as opposed to RF signals from other sources.

To achieve a signal strength measurement in such a narrow signal band, the leakage detectors typically downconvert the received RF signal to an intermediate frequency substantially below the 115 MHz range. Such frequency conversion allows for the use of conventional filters to produce the required narrow bandwidth signal. The Searcher Plus leakage detector, available from Trilithic, Inc., operates in this manner.

The one problem associated with presently available leakage detection devices, and in particular, those that use the frequency conversion step referenced above, is power consumption. The various electronic circuitry within the leakage detectors, including the frequency conversion circuitry, consumes a significant amount of power. High power consumption is problematic in part because leakage detectors are typically battery-powered. Specifically, it has been observed that batteries within portable leakage detectors frequently require recharging or replacement. Frequent battery recharging and/or replacement can be inconvenient from the perspective of the field technician.

While advances in battery technology may improve battery charge-life to partially overcome the need to frequently recharge or replace the batteries in leakage detectors, there is nevertheless a need for leakage detection equipment that consumes less power while providing the sensitivity and capabilities that are currently available.

SUMMARY OF THE INVENTION

The present invention fulfills the above needs, as well as others, by providing a leakage detection receiver circuit that directly demodulates the detected RF signals. In other words, the leakage detector does not frequency-convert or mix down the detected RF signals before demodulation. The elimination of the circuit components required for frequency conversion, for example, an oscillator and a mixer, significantly reduces the power consumed by the leakage detector. The reduced power consumption has several benefits, including increasing the charge-life of the batteries used to provide power to the detector.

An exemplary receiver circuit according to the present invention, which may be used in a leakage detector, includes an RF input, a narrow band filter, and a direct demodulator. The leakage detector in which the receiver circuit may be used is operable to measure leakage in a communication system, the communication system operable to transmit broadband communication signals comprising one or more radio frequency carrier signals modulated by one or more baseband communication signals, wherein each radio frequency carrier signal has a channel frequency. Essentially, the exemplary receiver circuit according to the present invention is operable to generate a baseband leakage signal.

To this end, the RF input is operable to receive a broadband communication signal, the broadband communication signal including a first signal associated with a first channel frequency. The narrow band filter is operably coupled to the RF input to receive at least a portion of the broadband communication signal and producing a filtered first signal therefrom, the narrow band filter having a Q value at least on the order of 1000 and further having a pass band that includes the first channel frequency. The direct demodulator is coupled to the narrow band filter, and is operable to generate a baseband leakage signal from the filtered first signal.

In a preferred embodiment, the first signal is a television signal, and the baseband leakage signal is a narrow band version of the baseband television signal. Well known methods of signal level measurement may then be used on the baseband leakage signal to determine leakage levels.

The narrow band filter allows for direct demodulation of high frequency signals, for example, those between 115 MHz and 140 MHz. The use of a direct demodulator, in other words, a demodulator that demodulates an unconverted RF signal, eliminates the need for frequency conversion circuitry. The elimination of the need for frequency conversion circuitry reduces power consumption by the detector.

The above described features and advantages, as well as others, will become more readily apparent to those of ordinary skill in the art by reference to the following detailed description and accompanying drawings.

DETAILED DESCRIPTION

Figure 1:
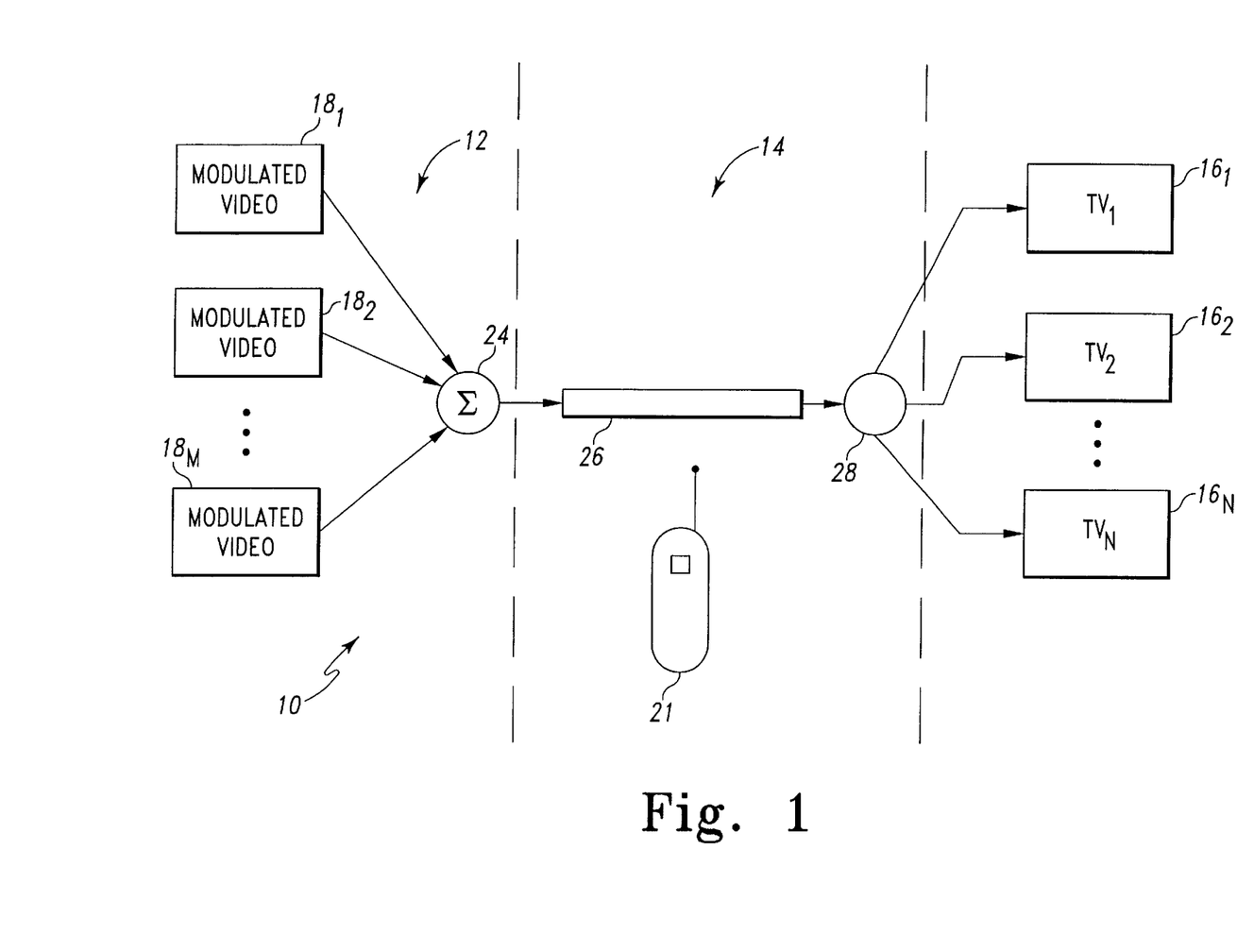
FIG. 1 shows a leakage detector according to the present invention as used in connection with a communication system.

FIG. 1 shows a leakage detector 21 according to the present invention as used in connection with a communication system. In the present embodiment, the communication system is a CATV system 10 for transmitting and distributing television signals and other information to subscriber receivers. The CATV system 10 in this embodiment transmits and distributes television signals in the NTSC standard format, the details of which are well known to those of ordinary skill in the art. The CATV system 10 includes a head end transmission subsystem 12, a distribution network 14, and a plurality of subscriber receivers shown by example herein as television receivers $16_1$, $16_2$, ... $16_N$. Subscriber receivers may alternatively include, among other things, video monitors and computer monitors.

The transmission subsystem 12 includes a plurality of sources of television signals, shown by example herein as modulated video sources $18_1$, $18_2$, ... $18_M$, and a combiner 24. The transmission subsystem 12 is operable to generate a broadband communication, or simply CATV signal, as is known in the art.

In general, a CATV signal as described herein comprises, among other things, at least one television signal, the television signal including a baseband television signal modulated onto a carrier signal. Each carrier signal has a frequency referred to as a CATV channel frequency that is associated with one of a plurality of CATV channels. The CATV channel frequencies are typically within the 5 MHz to 1000 MHz frequency band, and are separated by a predetermined frequency interval. In United States cable systems, the CATV channel frequencies are typically separated by 6 MHz or integer multiples thereof.

The modulated video source 181 is a circuit well known in the art that includes a carrier signal generator, not shown, and a baseband television signal source, not shown. In general, the modulated video source 18 is operable to generate a television signal at a predetermined CATV channel frequency. Likewise, the modulated video sources $18_2$ ... $18_M$ are operable to generate television signals, each of which has a distinctive CATV channel frequency.

The modulated video sources $18_1$, $18_2$, ... $18_M$ are each connected to the signal combiner 24, which combines the various television signals into a single broadband CATV signal. The combiner 24 is connected to provide CATV signals to the distribution network 14. The distribution network 14 comprises a plurality of elements including coaxial cable, repeater amplifiers, splitters and other elements typically employed by CATV service providers. By way of representative illustration only, the distribution network 14 is shown herein as including a cable 26 and a splitter 28. The cable 26 typically comprises a network of coaxial cable or other suitable conduit for transmission of CATV signals through a geographical area interspersed with subscribers.

In the example discussed herein, the cable 26 connects the combiner 24 to the splitter 28. The splitter 28 is then connected to the plurality of television receivers $16_1$ ... $16_N$. The television receivers $16_1$ ... $16_N$ are, in general, commercially available television receivers designed or adapted to receive CATV signals and tune to particular channel frequencies within the CATV signal.

Regardless of the particular make-up, the distribution network 14 is susceptible to faults, cable breaches, faulty interconnections, and other nonconformities that allow leakage. Leakage refers to both egress of CATV signals from the distribution network 14 and ingress of spurious signals into the distribution network 14. The egress of the CATV signal out of the distribution network 14 can potentially interfere with aeronautical communication and ingress of spurious signals can increase the noise within the CATV system.

The leakage detector 21 is an apparatus according to the present invention that assists in identifying and locating leakage points in the distribution network 14. In accordance with industry and regulatory standards, the leakage detector 21 detects and measures signal strength of a select signal having a select channel frequency that overlaps the frequency band used for aeronautical communications. In the exemplary embodiment described herein, the leakage detector 21 measures a television signal having a CATV channel frequency of between approximately 115 MHz and 140 MHz. The technician may then use the resulting signal strength measurement to determine whether a leakage problem is indicated. In alternative embodiments, the leakage detector 21 may perform signal strength measurements of signals having a channel frequency outside the aeronautical communication band. In yet other embodiments, the leakage detector 21 may detect a test signal comprising a carrier wave signal instead of a television signal.

In the operation of the CATV system 10, the plurality of the modulated video sources $18_1$ ... $18_M$ generate television signals associated with one of a plurality of CATV channels. The combiner 24 then combines those television signals to produce a broadband CATV signal for transmission. The combiner 24 provides the broadband CATV signal to the cable 26.

The CATV signal traverses the cable 26 to the splitter 28. The splitter 28 then distributes the CATV signal to each of the television receivers $16_1$, ... $16_N$. One or more of the television receivers $16_1$ ... $16_N$ tunes to a select CATV channel and performs the appropriate signal processing to provide a visible and audible presentation of the program information.

In leakage detection operation, a field technician moves the leakage detector 21 along various portions of the distribution system 14 to attempt to identify sources of leakage. As discussed above, the leakage detector 21 is tuned to receive a select television signal. As the leakage detector 21 is moved from point to point, it provides frequently-updated information regarding the detected strength of the select television signal. If the technician passes in close proximity to a leakage point in the distribution system, then the leakage detector 21 would detect or measure a relatively high signal strength due to the leakage of the CATV signal. If, however, the technician is not in close proximity to a leakage point, then the leakage detector 21 would detect a relatively low signal strength as little or no CATV signal is present.

According to the present invention, the leakage detector 21 detects and/or measures the select television signal without performing any frequency conversion on that signal. As a consequence, the leakage detector 21 need not include power consuming frequency conversion circuit elements, such as mixers and oscillators. The leakage detector 21 according to the present invention is therefore more energy-efficient and has a longer battery charge life than prior art leakage detectors. Further advantages of the leakage detector 21 according to the present invention are discussed below in connection with FIGS. 2 and 3.

Figure 2:
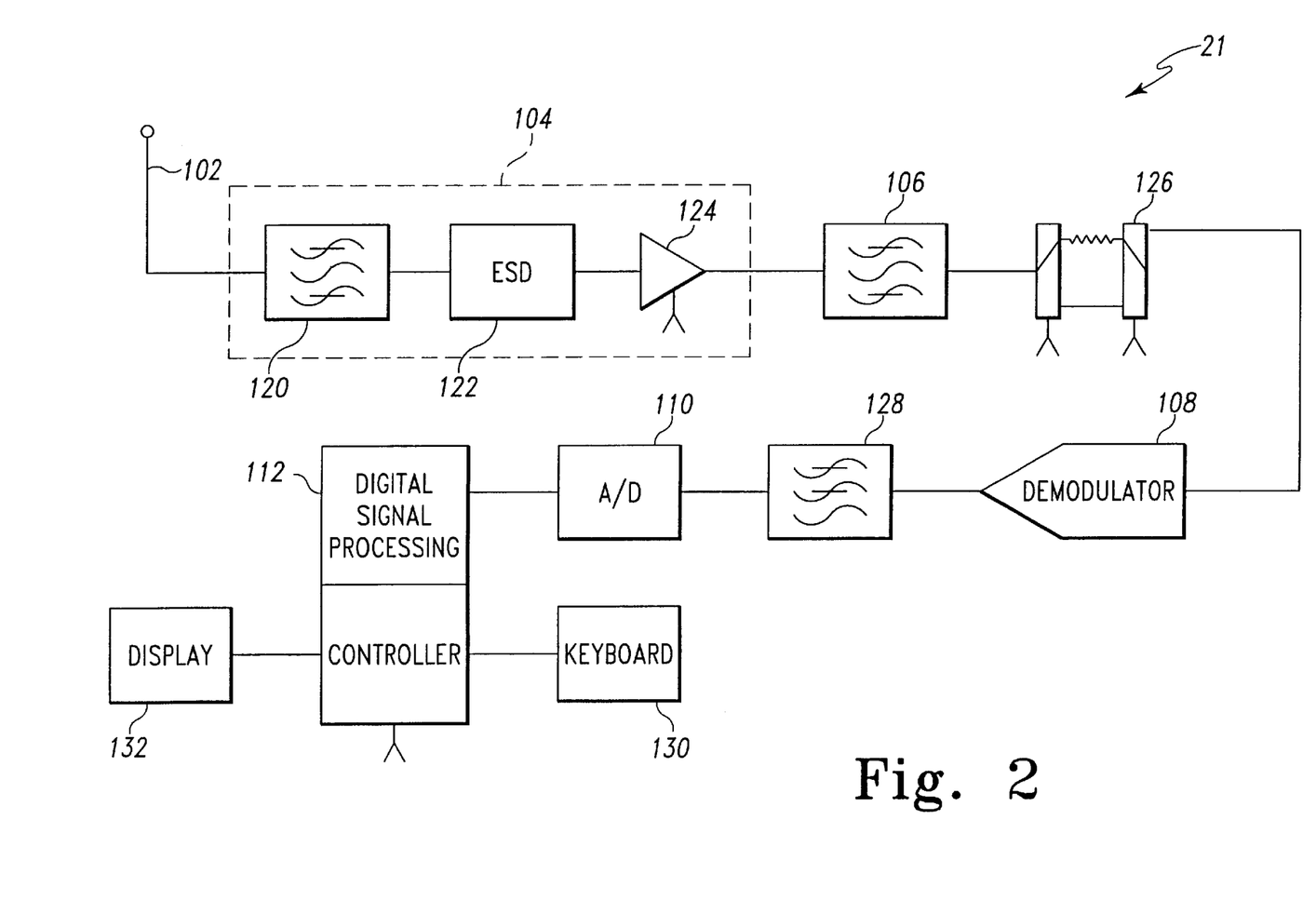
FIG. 2 shows a block circuit diagram of the leakage detector of FIG. 1.

FIG. 2 shows a block circuit diagram of a first embodiment of the leakage detector 21 of FIG. 1. The leakage detector 21 includes a receiver circuit comprising an antenna 102, an RF input circuit 104, a narrow band filter 106 and a demodulator 108. The leakage detector 21 in the embodiment described herein further includes a measurement circuit comprising an analog to digital ("A/D") converter 110, a digital signal processing/control ("DSP/C") circuit 112, a keyboard 130, and a display 132.

The antenna 102 is any RF radiation antenna operable to receive a broadband communication signals including a first signal associated with a first channel frequency, wherein the first signal is a signal from which leakage measurements may be made. In the embodiment described herein, the broadband communication signal is a CATV signal including a plurality of television signals, and the first signal is a select one of the television signals, or alternatively a simulated television signal, that consists of information modulated onto a CATV carrier signal. The antenna 102 is connected to provide the broadband communication signal to the RF input circuit 104.

The RF input circuit 104 is a circuit operable to receive the broadband communication signal and provide at least a portion of the broadband communication signal including the first signal to the narrow band filter 106. In the exemplary embodiment described herein, the RF input circuit 104 provides a prefiltered and preamplified version of the broadband signal to the narrow band filter 106. To this end, the RF input circuit 104 further comprises a band pass filter 120, an electrostatic discharge ("ESD") device 122, and an RF amplifier 124. The band pass filter 120 is a filter having a pass band that includes the first channel frequency. The band pass filter 120 typically has a Q value of on the order of 40 to 150, where the Q value is defined as the center frequency of the filter divided by the bandwidth of the filter. In the embodiment described herein, the band pass filter 120 is an LC filter having a center frequency at approximately 133 MHz and a pass band of approximately 3 MHz. As will be discussed in detail further below, the band pass filter 120 effectively reduces the potential for intermodulation distortion in the RF amplifier 124.

The band pass filter 120 is connected between the antenna 102 and the ESD device 122. The ESD device 122 may suitably be a Schottky diode or similar electrostatic discharge device as is known in the art. The ESD device 122 is further connected to the RF amplifier 124. The RF amplifier 124 is an amplifier that is operable to provide low distortion amplification to the broadband communication signal, or at least a portion thereof. To this end, the RF amplifier 124 preferably has a relatively high 1 dB compression point. RF amplifiers having these characteristics are commercially available. For example, the RF amplifier 124 may suitably be an MSA-1105 modular amplifier available from Hewlett-Packard. The purpose of the RF amplifier 124 is to provide pre-amplification to relatively low strength detected leakage signals. Such preamplification also improves the noise figure for the receiver circuit. The RF amplifier 124 is further connected to the narrow band filter 106.

The narrow band filter 106 is a filter operable to receive at least a portion of the broadband communication signal and produce a filtered first signal therefrom. The filtered first signal primarily comprises a portion of the first signal that falls within a narrow frequency band of the first CATV channel frequency.

Specifically, as discussed above, leakage measurement techniques typically measure the signal level of a narrow spectral portion of a television signal. The measurement of a narrow spectral portion reduces the possibility that non-CATV signals, or in other words, extraneous signals, will be included in the measurement. For example, suppose a leakage measurement is taken on a television signal at 133.2625 MHz, and also present is a large amplitude aeronautical transmission on a 131 MHz carrier. The leakage measurement may erroneously include energy from the aeronautical transmission if a wide spectral portion of the television signal is measured. To reduce the potential for such erroneous inclusion of extraneous signals, the signal to be measured for leakage is usually filtered to a narrow bandwidth of no more than a 200 kHz bandwidth, and preferably a much narrower bandwidth Accordingly, the narrow band filter 106 is preferably a relatively high Q filter having a center frequency at or near the first CATV channel frequency. The high Q filter allows for 200 kHz or less bandwidth at a high center frequency, such as at the channel frequencies between 115 MHz and 140 MHz. Without a high Q filter, a frequency conversion step would be required to achieve the narrow signal band required for accurate leakage measurements.

In the exemplary embodiment described herein, the narrow band filter 106 has a center frequency of between 115 MHz and 140 MHz, and furthermore has a bandwidth of approximately 100 kHz. As a result, the narrow band filter 106 is a filter that has a Q value exceeding 1000.

To obtain such a response, the narrow band filter 106 in the preferred embodiment is a surface acoustic wave filter. The surface acoustic wave ("SAW") filter is one of few technologies that is currently capable of providing the required high Q operation in an economically feasible manner. At present, SAW filters theoretically are capable of providing as little as 30 kHz of bandwidth at frequencies between 115 MHz and 140 MHz. However, SAW filters having a 100 kHz bandwidth in that frequency range are more economical and provide an adequately narrow pass band. Nevertheless, it is contemplated that at some point, SAW filters having a 30 kHz bandwidth in the subject frequency range will become more cost effective and therefore may be preferable for use as the narrow band filter 106.

Alternatively, the narrow band filter 106 may be an acoustically-coupled crystal filter, such as that offered by Motorola, Inc. Other filters are capable of such performance, but are currently cost prohibitive. It is foreseen that the use of such alternative filter technology may at some point be equally as preferable as SAW filter technology.

In any event, the narrow band filter 106 is further connected to the demodulator 108 through a switchable attenuator 126. The switchable attenuator 126 is a device that is operable to alternatively and controllably introduce either no attenuation or 20 dB of attenuation into signals passing therethrough. The switchable attenuator 126 preferably has a control input connected to the DSP/C circuit 112.

The demodulator 108 is a device operable to receive the filtered first signal and generate a demodulated filtered first signal, or baseband leakage signal therefrom. Further detail regarding the baseband leakage signal is discussed below in connection with the operation of the leakage detector 21. In any event, the demodulator 108 is preferably a log amplifier detector, which generates a logarithmic representation of the amplitude modulation of the first signal. For television signals, which are primarily amplitude modulated but also incorporate other modulation schemes, the log amplifier detector produces a baseband version of only the amplitude modulated portions of the television signal. It is noted that in an embodiment in which the first signal is a test signal comprising simple sinusoid carrier wave signal, the log amplifier detector would generate a baseband leakage signal representative of the power level of that carrier wave signal.

In any event, the demodulator 108 is operably coupled to provide the baseband leakage signal to the A/D converter 110 through the anti-aliasing filter 128. The A/D converter 110 preferably performs a 12 bit resolution A/D conversion having a sampling rate of 1 MHz. The A/D converter 110 is operably coupled to provide the digital baseband leakage signal to the DSP/C circuit 112.

The DSP/C circuit 112 constitutes the measurement portion of the leakage detector 21, and may be any suitable combination of a digital signal processing device, a microprocessor, and discrete digital components which together provide the functionality of the leakage detection measurement and device control. Those of ordinary skill in the art may readily determine a suitable combination of components. For example, in one embodiment the DSP/C circuit 112 may comprise a field programmable gate array ("FPGA") and a microprocessor.

In general, to perform the measurement, the DSP/C circuit 112 is operable to measure the magnitude of either the horizontal synchronization pulses, or vertical synchronization pulses of a television signal. Circuits capable of carrying out such a measurement may be found in the model CLI-1450 product, available from Wavetek Corporation, Indianapolis, Indiana.

In operation, the leakage detector 21 generates a signal strength measurement of the first signal, which constitutes a part of the broadband communication signal generated by the transmission subsystem 12 (of FIG. 1). A relatively high signal strength measurement indicates that the first signal, and presumably the remaining portions of the broadband communication signal, are leaking out of the distribution network 14 due to a cable breach or other nonconformity. Accordingly, a measured high signal strength indicates to a technician that corrective action needs to be taken. Contrariwise, a relatively low signal strength measurement indicates that the first signal is not leaking out of the distribution network 14. In such a case, no corrective action would need to be taken.

As discussed above, the broadband communication signal in the exemplary embodiment described herein comprises a broadband multi-channel CATV signal, and the first signal is a select television signal which comprises a baseband television signal modulated onto a first CATV channel frequency. In accordance with industry and/or government standards the first channel frequency is preferably between 115 MHz and 140 MHz, and is 133.2625 MHz in the example described herein. The standard leakage measurement includes measuring the level of synchronization pulses within the baseband television signal. Such a measurement provides a consistent and repetitive reference level from signal to signal, as opposed to measuring the energy of the video content, which will vary depending upon the nature of the program content.

The antenna 102 receives the broadband CATV signal to the extent that the broadband CATV signal is leaked into the atmosphere. The antenna 102 provides that signal to the band pass filter 120. The band pass filter 120 generates a prefiltered CATV signal, which preferably includes a prefiltered version of the first signal, and provides the prefiltered signal to the RF amplifier 124 through the ESD device 122. In the example described herein, the band pass filter provides a prefiltered CATV signal having a signal band from approximately 1.5 MHz below the carrier frequency, or 131.7625 MHz, to approximately 1.5 MHz above the carrier frequency, or 134.7625 MHz.

The band pass filter 120 is required to reduce the possibility that the RF amplifier 124 will introduce intermodulation distortion into the prefiltered CATV signal. In particular, during normal operation, the antenna 102 receives other signals, such as FM radio broadcasts, in addition to the leaked broadband CATV signal. Some FM radio broadcasts may have a strength far in excess that of the detected broadband CATV signal. Signals of such strength can cause the RF amplifier 124 to operate in a nonlinear fashion, thereby resulting in intermodulation distortion. The prefiltering provided by the band pass filter 120 will eliminate most, if not all, such high strength signals. As a result, the band pass filter 120 reduces or eliminates potentially detrimental intermodulation distortion.

The RF amplifier 124, under the control of the DSP/C circuit 112, provides a controllable level of boost to the prefiltered CATV signal. The RF amplifier 124 then provides the prefiltered CATV signal to the narrow band filter 106. The narrow band filter 106 then filters the prefiltered CATV signal to produce a filtered first signal comprising primarily a narrow band version of the first signal. In the embodiment described herein, the narrow band filter 106, which is preferably a surface acoustic wave ("SAW") filter, generates an output consisting of the portion of the first signal within ±50 kHz of 133.2625 MHz.

The filtered first signal is then provided to the switchable attenuator 126. The switchable attenuator 126, which operates as an input signal scaling device, provides either 20 dB of attenuation or no attenuation at all. By scaling, it is meant that the received filtered first signal is scaled such that its dynamic range is compatible with the A/D converter 110. To this end, the DSP/C circuit 112 causes the switchable attenuator 126 to provide 20 dB of attenuation when the signal measurements are relatively large, and no attenuation when the signal measurements are relatively small. In either event, the switchable attenuator 126 then provides the filtered first signal to the demodulator 108.

The demodulator 108 generates a baseband leakage signal from the filtered first signal. To this end, the demodulator 108 demodulates, or removes the carrier signal from, the filtered first signal. The resultant baseband leakage signal consists primarily of the television baseband signal low pass filtered at approximately 50 KHz. Because the video content has frequency components typically as high as 2.8 MHz from the carrier, it is evident that the baseband leakage signal is not the full video baseband signal. The baseband leakage signal, however is a version of the baseband television signal that includes the vertical synchronization pulses, which are subsequently used for the actual leakage signal measurement.

The baseband leakage signal is then low pass filtered by the anti-aliasing filter 128 to remove any high frequency noise that might cause aliasing during the A/D conversion process. The anti-aliasing filter 128 then provides the resulting filtered baseband leakage signal to the A/D converter 110. The A/D converter 110 samples the filtered baseband leakage signal to produce a digital baseband signal.

The A/D converter 110 provides the digital baseband signal to the DSP/C circuit 112. The DSP/C circuit 112 then generates data related to the signal strength and possibly other aspects of the digital baseband signal. As discussed above, the signal strength of the digital baseband signal provides an indication of the level of signal leakage.

To this end, the DSP/C circuit 112 uses digital correlation calculations to isolate the vertical synchronization pulses from the digital baseband signal. The vertical synchronization pulses occur once per field of an NTSC or PAL video signal. Accordingly, the correlation calculation uses the known field frequency (e.g. 60 Hz in NTSC video signals) of the television signal in order to isolate the vertical synchronization pulses. For example, a time domain correlation may be implemented that correlates the digital baseband signal to a pulse train that corresponds to the field frequency. The result of the time domain correlation is a collection of digital values that are representative of the plurality of vertical synchronization pulses from the digital baseband signal. Those of ordinary skill in the art may implement the above synchronization pulse isolation technique, as well as others, using digital signal processing techniques.

Once the vertical synchronization pulses are isolated, the DSP/C circuit 112 collects the peak sample values of the isolated vertical synchronization pulses. The DSP/C circuit 112 then averages the peak values from a plurality of vertical synchronization pulses over time. The averaging function helps negate the effects of low frequency oscillations in the vertical synchronization pulse amplitude. Such low frequency oscillations may, for example, result from a low frequency tagging signal that is superimposed on the television signal to help identify the source of the signal. The use of tagging signals is not addressed herein, but is generally known in the art.

The average peak values provide a measurement of the strength of the first signal. The DSP/C circuit 112 then provides an indication signal representative of the signal strength of the first signal to the display 132. The display 132 may suitably be an LCD display that provides a bar graph representation of the signal level. The technician or user may then determine from the bar graph representation whether a leakage point is indicated in the distribution network 14 in the vicinity of the leakage detector 21. Alternatively, an audible alarm may be used that is actuated only when the first signal strength exceeds a predetermined threshold.

As a result, the leakage detector 21 of the present invention generates leakage signal measurements without the need for frequency conversion circuitry. Frequency conversion circuits typically include a local oscillator and a mixer, and often include amplification and filtering devices. Such frequency conversion devices not only occupy physical space within the leakage detector, thereby increasing its weight and size, but further consume additional electrical power. The present invention eliminates the need for such frequency conversion devices in part employing a high Q filter, for example, the SAW filter, to provide the necessary signal spectrum of the first signal, e.g. within 100 kHz of the carrier signal, at the carrier signal frequency, which is typically between 115 MHz and 140 MHz. Lower Q filters used at such carrier signal frequencies would produce baseband leakage signals having a signal spectrum well in excess of 100 kHz, which greatly increases the likelihood that externally generated signals will be included in the leakage signal strength measurement.

The present invention, by eliminating the need for such frequency conversion devices, reduces the not only the potential size of the leakage detector, but also its power consumption. The extra power consumption by the frequency conversion devices can be especially detrimental to battery-powered leakage detectors. Any unnecessary power consumption shortens the time the leakage detector may be used without replacing or recharging the batteries.

It will be noted that the use of a television signal per se as the first signal is given by way of example only. Because leakage measurement typically only requires the presence of a repetitive, constantA-level signal feature, such as the vertical interval pulse, the first signal may alternatively be composed of any modulated baseband signal that includes such a repetitive, constant-level signal feature. For example the first signal may compromise a blank video signal with a simulated vertical interval. Such a signal may be used when no television signal is present on the CATV channel frequency to be test, e.g., 133.2625 MHz.

Another device that carries out leakage detection is a combination meter. A combination meter is a device that combines leakage detection with signal level monitoring. Such a combination meter may be used to detect and/or measure leakage signals in a manner similar to that described above in connection with FIGS. 1 and 2. In addition, however, the combination meter may additionally be used to measure the signal level of one or more television signals in the CATV signal at termination points. Signal level monitoring is a standard test procedure used by CATV service providers to ensure that customers are receiving sufficient signal strength on a per-channel basis. Referring again to FIG. 1, a combination meter performs signal level monitoring by connecting the combination meter between the splitter 26 and any one of the plurality of televisions $16_1 \ldots 16_N$.

Figure 3:
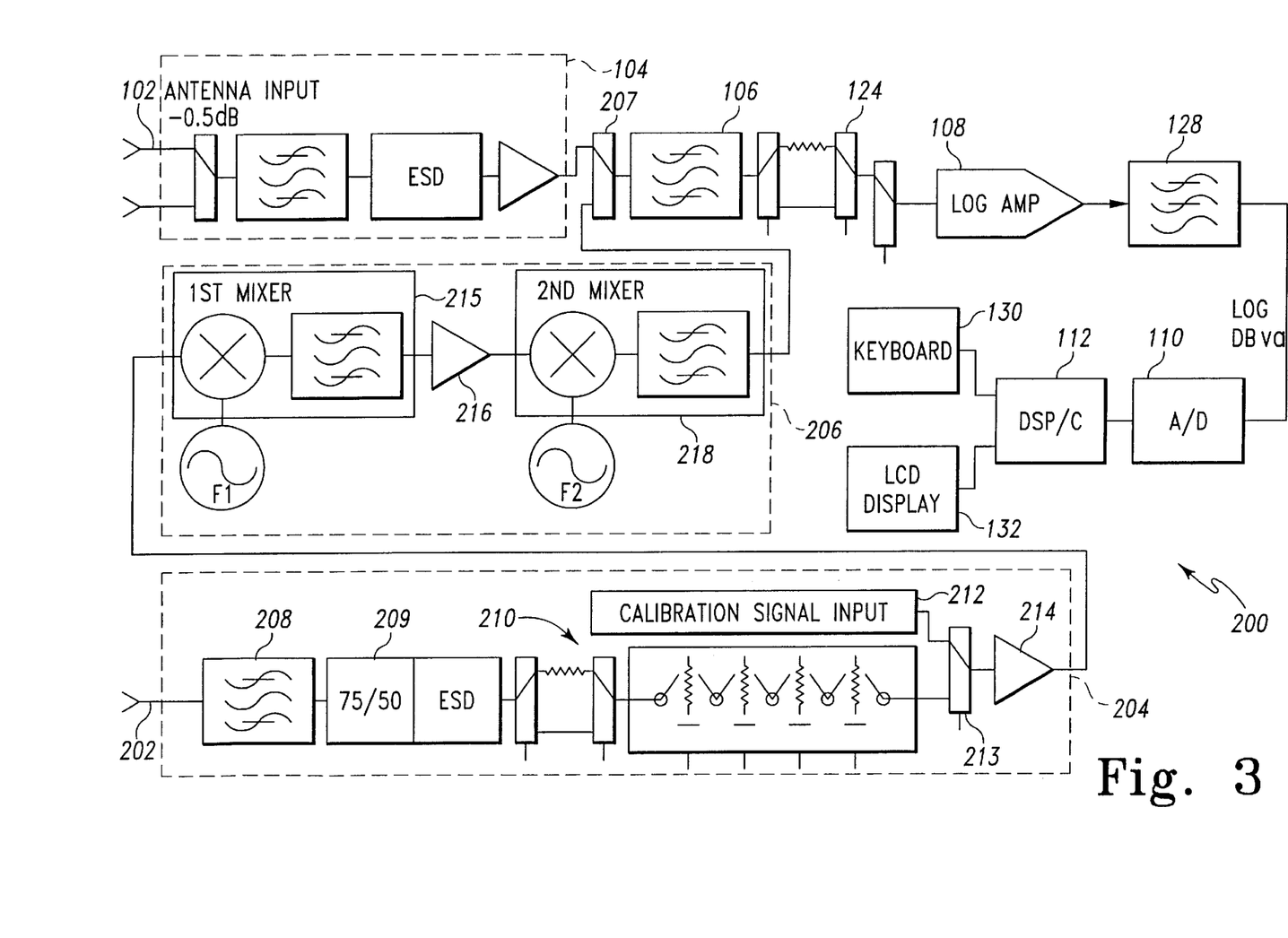
FIG. 3 shows a block circuit diagram of a combination leakage detector and signal level monitor according to the present invention.

FIG. 3 shows a combination meter 200 according to the present invention that incorporates the direct demodulation of leakage signals to reduce power consumption. Although the combination meter 200 includes frequency conversion devices for use in connection with signal lever monitoring, the combination meter 200 according to the present invention does not use those frequency conversion devices when performing leakage detection, thereby conserving energy while operating in leakage detection mode.

The combination meter 200 essentially comprises the leakage detector 21 with two significant additions. First, RF circuitry required for signal level monitoring is incorporated. Second, additional functionality associated with signal level monitoring must be added to or programmed into the DSP/C 112. As a matter of convenience, equivalent components in FIGS. 2 and 3 are identified by the same reference numerals.

In general, the combination meter 200 includes a first RF input circuit 104, a second RF input circuit 204, a frequency conversion stage 206, a coupling device 207, a arrow band filter 106, a demodulator 108, an A/D converter 110, a DSP/C 112. The first RF input 104, the narrow band filter 106, the demodulator, the A/D converter 110, and the DSP/C 112 all have generally the same structure as described above in connection with FIG. 1.

As discussed above, the first RF input 104 is operable to receive broadband signals including a first signal comprising a baseband signal modulated onto a first carrier signal having a first channel frequency. Because the first RF input 104 receives signals in a leakage detection mode of operation, the first channel frequency is typically between 115 MHz and 140 MHz, and in the exemplary embodiment is approximately 133 MHz. The first RF input 104 is connected to receive the broadband communication signal from either an antenna 102 or a docking station input 102a. The first RF input 104 is further connected to the switch 207.

The second RF input 204 comprises an input stage that is operable to receive, and provide initial conditioning to, a second broadband signal received from a communication system distribution system. The second broadband signal is also preferably a CATV signal and includes a second signal to be measured or monitored. The second signal is also preferably a television signal, but is associated with a second channel frequency typically distinct from the first channel frequency. Because the signal level monitoring function of the combination meter 200 can preferably measure all CATV channels, the RF input is operable to receive second signals having a second channel frequency between 5 MHz and 1000 MHz.

The second RF input 204 is connected to receive the second broadband signal or second CATV signal, from a measurement signal input 202, which may, for example, be a coaxial cable termination in a customer residence or the like. The second RF further includes a band pass filter 208, an impedance matching circuit 209, a variable attenuator 210, a calibration signal input 212, a calibration signal switch 213, and an amplifier 214. The bandpass filter 208, the impedance matching circuit 209, and the variable attenuator 210 are serially connected. The bandpass filter 208 is further connected to the measurement signal input 102.

The bandpass filter 208 is an RF filter that has a pass band consisting of the entire CATV spectrum, which is at present is approximately 5 MHz to 1000 MHz. The impedance matching circuit 209 may suitably be any known transformer that converts the characteristic impedance of the RF circuit 50 ohms to 75 ohms. The impedance matching circuit 209 also preferably includes an ESD device. Such RF filters and impedance matching circuits are well known.

The variable attenuator 210 includes a plurality of switchable impedance stages controlled by the DSP/C 112 or some other device. The variable attenuator 210 is operable to adjust the attenuation provided to the second CATV signal by the second RF input 204 for the purposes of scaling. For example, if the received second CATV signal is relatively strong, the DSP/C 112 may cause the variable attenuator 210 to increase the attenuation provided in order to scale the second CATV signal to preferred levels for carrying out signal level monitoring measurements. Likewise, if the received second CATV signal is relatively weak, the DSP/C 112 may cause the variable attenuator 210 to reduce the attenuation in order to increase the amplitude of the second CATV signal. The DSP/C 112 causes the impedance adjustment by providing control signals to the variable attenuator 210, which selectively activates various and progressive impedance stages. In the examplary embodiment described herein, the variable attenuator 210 includes independently actuatable stages of 23 dB, 16 dB, 8 dB, 4 dB, and 2 dB of attenuation, respectively.

The calibration signal input 212 is operable to be connected to a source of calibration signals. The calibration signals are employed to allow the DSP/C 112 to calibrate the second input circuit 204 as necessary to compensate for the effects of temperature variation on the RF devices within that circuit. The calibration signal switch 213 is an electronically controlled switch that alternatively connects the variable attenuator 210 and the calibration signal input 212 to the amplifier 214. The amplifier is an RF amplifier that provides approximately 13 dB of gain. The amplifier 114 is thereafter connected to the frequency conversion stage 206.

The frequency conversion stage 206 includes the following serially connected components: a first conversion stage 215, an IF amplifier 216, and a second conversion stage 218. Each of the conversion stages comprises a frequency conversion circuit that includes a mixer, a local oscillator ("LO"), and a filter. The LOs of the first and second conversion stages 215 and 218, respectively, are connected to and are controlled by the DSP/C 112. The IF amplifier 216 is an RF amplifier operable to provide approximately 10 dB of gain.

Specifically, the first conversion stage 215 is coupled to receive the second CATV signal from the amplifier 214. The first conversion stage 215 is operable to generate a first IF signal and provide the first IF signal to the second conversion stage 218 through the IF amplifier 216. The second conversion stage 218 is operable to generate a second IF signal comprising a frequency converted version of at least a portion of the second CATV signal, and wherein the second signal is converted such that it has a carrier signal frequency that is approximately equivalent to the first channel frequency. The second conversion stage 218 is coupled to provide the frequency converted second CATV signal to the coupling device 207.

The coupling device 207 is preferably an electronically controlled RF switch, such as a diode switch or a GaAs FET switch. The coupling device 207 is operably coupled to the narrow band filter 106 to provide a connection between the narrow band filter 106 and one of the frequency conversion circuit 206 and the first RF input 104.

The narrow band filter 106 is further coupled to the demodulator 108 through a switchable attenuator 124. The demodulator 108 is operably coupled to the A/D converter 110 through an anti-aliasing filter 128. The narrow band filter 106, the demodulator 108, the switchable attenuator 124, the anti-aliasing filter 128, and the A/D converter may all suitably be the same devices as those described above in connection with FIG. 2. In general, however, the narrow band filter 106 is a filter operable to receive either the filtered first signal having a carrier signal frequency at the first channel frequency, or the second signal having a carrier signal frequency converted to the first channel frequency. The narrow band filter 106 is further operable to filter either signal to produce a narrow band signal having a frequency band between ±50 kHz of the first channel frequency. The demodulator 108 is operable to receive the signal produced by the narrow band filter 106 and generate a demodulated version of that signal. The A/D converter 110 is operable to sample the demodulated signal generated by the demodulator 108.

The A/D converter 110 is operably connected to the DSP/C 112. The DSP/C 112 is operable to receive the digital baseband signal and generate either leakage measurement data or signal level monitoring data therefrom.

In operation, the combination meter 200 receives either leakage signals or SLM signals and produces either leakage measurement data or SLM data therefrom. The RF portion of the combination meter 200, specifically, the first RF input 104, the second RF input 204, the frequency conversion stage 206, the narrow band filter 106, and the demodulator 108 provide normalized, amplified, filtered signals at a standard frequency regardless of the source or strength of the received signal.

Signal Level Monitoring

In SLM measurement, the combination meter 200 essentially performs a measurement of a select one of the communication signals in the broadband communication signal. Specifically, in a CATV system, the signal to be measured is a television signal. The combination meter 200 allows the user to select the television signal to be tested via keyboard input. Preferably, the user may select for SLM measurement any channel frequency between 5 MHz and 1000 MHz. The selected television signal then becomes the signal upon which an SLM measurement is to be taken, referred to herein as the second signal. Alternatively, the user may select several television signals at various CATV channel frequencies. In such a case, the DSP/C circuit 112 would sweep through the selected CATV channel frequencies and take measurements of each signal. In such a case, the second signal is each television signal being measured at the time it is being measured. CATV channel sweep testing methods are well known in the art.

In any event, to measure the second signal, the DSP/C circuit 112 causes the coupling device 207 to connect the frequency conversion circuit 206 to the narrow band filter 106. The DSP/C circuit 112 further causes the calibration signal switch 213 to connect the variable attenuator 210 to the amplifier 214. The DSP/C circuit 112 may of course periodically cause the calibration signal switch 213 to connect the calibration signal input 212 to the amplifier 214 to facilitate calibration. Ordinarily, however, the calibration signal switch 213 is configured to connect the variable attenuator 210 to the amplifier 214 to facilitate SLM measurements.

The second CATV signal, including the second signal, is received through the measurement signal input 202 and then filtered by the band pass filter 208 to remove frequency components outside the CATV frequency spectrum of 5 MHz to 1000 MHz. The variable attenuator 210 then provides attenuation to the filtered second CATV signal at a level selected by the DSP/C circuit 112. The DSP/C circuit 112 selects the attenuation level based on the strength of the received signal and factors that attenuation level into its measurement calculation.

The filtered second CATV signal then propagates through the calibration signal switch 213 to the amplifier 214, which amplifies the broadband signal by approximately 13 dB. The amplifier 214 further sets the noise figure for the second CATV signal, and furthermore reduces any reverse path leakage from the local oscillators of the frequency conversion stage 206 to the second RF input circuit 204.

The first conversion stage 215 and the second conversion stage 218 operate together to convert the second CATV signal such that the carrier signal frequency of the second signal is converted to the first channel frequency. Specifically, the second CATV signal is frequency-converted such that the second signal has a carrier frequency that is approximately equal to the center frequency of the narrow band filter 106. To this end, the first conversion stage 215 converts the broadband signal by mixing in an LO signal having a frequency of between 1580 MHz and 2575 MHz. The DSP/C circuit 112 selects the LO frequency that is equal to the second channel frequency plus 1575 MHz.

The first conversion stage 215 then converts the second CATV signal such that the carrier signal of the second signal is centered around approximately 1575 MHz. After amplification by the IF amplifier 216, the second conversion stage 218 down-converts the second CATV signal by mixing in an LO frequency of approximately 1441.7375 MHz. The second conversion stage 218 thus produces an IF signal in which the second signal has a channel frequency of approximately 133.26235 MHz. The IF signal is then provided to the narrow band filter 106.

The narrow band filter 106 then filters the IF signal to produce a filtered second signal. Specifically, the narrow band filter 106 generates a filtered second signal having a signal band within ±50 kHz of the second channel frequency. The narrow pass band of the narrow band filter 106 essentially eliminates other signals within the CATV signal. The narrow band filter 106 then provides the filtered and converted second signal to the demodulator 108 through the switchable attenuator 124.

The demodulator 108 operates in the manner set forth above in connection with FIG. 2 to demodulate the filtered and converted second signal. The demodulator 108 provides the resulting baseband second signal to the anti-aliasing filter 128, which then filters out any residual high frequency components in the baseband second signal. The anti-aliasing filter 128 then provides the filtered second baseband signal to the A/D converter 110.

The A/D converter 110 samples the second baseband signal to generate a digital baseband signal therefrom. The digital baseband signal is then provided to the DSP/C circuit 112.

The DSP/C circuit 112 then generates a signal level measurement from the digital baseband signal. Specifically, the digital baseband signal in the exemplary embodiment is sampled, narrow band version of a television signal. The DSP/C circuit 112 performs a signal level measurement on the television signal using the peak values of one or more synchronization pulses within the baseband television signal. For example, the mean of several peak values provides a measurement of television signal levels. The DSP/C circuit 112 then generates an indication signal containing information representative of the signal level information. The DSP/C circuit 112 provides the indication signal to the display 132, which displays the information to the user.

Leakage Detection

In leakage detection, the combination meter 200 essentially operates as described above in connection with FIG. 2. In addition, however, the DSP/C circuit 112 causes the unused portions of the combination meter 200, in other words, those circuit elements related exclusively to the SLM measurement, to become inoperative to reduce energy consumption.

The user first indicates through entry on the keyboard 130 that the combination meter 200 is to perform leakage measurements. The DSP/C circuit 112 then causes most or all of the power to be removed from at least the frequency conversion stage 206 and preferably also the second RF input 204. The DSP/C circuit 112 then causes the coupling device 207 to connect the first RF input 104 to the narrow band filter 206.

Once so configured, the combination meter 200 receives a first broadband communication signal including a first signal at the antenna 202 and generates and displays leakage measurement data therefrom. To this end, the first RF input 104, the narrow band filter 106, the demodulator 108, the A/D converter 110, the DSP/C circuit 112, and the display 132 all operate in the manner described above in connection with FIG. 2.

The combination meter 200 therefore provides both SLM and leakage measurement capabilities in a device that consumes less power similar devices that use frequency conversion in leakage measurement. The incorporation of direct demodulation of leakage signals allows the frequency conversion circuit to be used solely for signal level measurement. Accordingly, during leakage measurement, little or no power is consumed by the frequency conversion circuit components. The resulting combination meter 200 will have relatively longer time periods between battery replacement or battery recharging than prior art combination meters.

It will be noted that the above described embodiments are merely illustrative, and that those of ordinary skill in the art may readily devise their own implementations that incorporate the principles of the present invention and fall within the spirit and scope thereof.

What is claimed is:

1. A receiver circuit for use in a leakage detector, said leakage detector operable to measure leakage in a communication system, the communication system operable to transmit broadband communication signals comprising one or more radio frequency RF carrier signals modulated by one or more baseband communication signals, each (RF) carrier signal having a channel frequency, the receiver circuit operable to generate a baseband leakage signal, the receiver circuit comprising:

a) an RF input for receiving a broadband communication signal, the broadband communication signal including a first signal associated with a first channel frequency;

b) a narrow band filter operably coupled to the RF input for receiving at least a portion of the broadband communication signal and producing a filtered and unconverted first signal therefrom, the narrow band filter having a pass band that includes the first channel frequency; and c) a direct demodulator coupled to the narrow band filter, the direct demodulator operable to generate a baseband leakage signal from the filtered and unconverted first signal.

2. The receiver circuit of claim 1 wherein the RF input includes an RF amplifier coupled to the narrow band filter.

3. The receiver circuit of claim 2 wherein the RF input further includes a band pass filter coupled to the RF amplifier, the band pass filter operable to receive the broadband communication signal and generate a prefiltered signal therefrom, the band pass filter having a Q value of on the order of 100 or less, and wherein the narrow band filter is further operable to receive the prefiltered signal and generate a filtered first signal therefrom.

4. The receiver circuit of claim 1 wherein the narrow band filter comprises a surface acoustic wave filter.

5. The receiver circuit of claim 1 wherein the direct demodulator includes a log amplifier detector circuit.

6. The receiver circuit of claim 1 wherein the RF input is operable to receive broadband CATV signals, and wherein the narrow band filter has a center frequency within a range of frequencies extending from approximately 115 MHz to approximately 140 MHz.

7. The receiver circuit of claim 6 wherein the narrow band filter comprises a surface acoustic wave filter.

8. The receiver circuit of claim 6 wherein the direct demodulator comprises a log amplifier detector.

9. The receiver circuit of claim 1 wherein the RF input includes an antenna.

10. A receiver circuit for use in a leakage detector, said leakage detector operable to measure leakage in a communication system, the communication system operable to transmit broadband communication signals comprising one or more radio frequency carrier signals modulated by one or more baseband communication signals, each carrier signal having a channel frequency, the receiver circuit operable to generate a baseband leakage signal, the receiver circuit comprising:

a) an RF input for receiving a broadband communication signal, the broadband communication signal including a first signal having a first channel frequency;

b) a surface acoustic wave filter operably coupled to the RF input for receiving at least a portion of the broadband communication signal and producing a filtered first signal therefrom, and c) a log amplifier detector coupled to the surface acoustic wave filter, the log amplifier detector operable to generate a demodulated filtered first signal from the filtered first signal.

11. A circuit for use in a portable measurement device that performs signal level monitoring of RF signals and RF leakage detection, the circuit comprising:

a) a first RF input operable to receive a first broadband communication including a first signal having a first channel frequency;

b) a second RF input operable to receive a second broadband communication signal including a second signal having a second channel frequency;

c) a frequency conversion circuit for frequency converting the second signal to produce a converted second signal having the first channel frequency;

d) a narrow band filter having a pass band that includes the first channel frequency;

e) a coupling device for coupling said first RF input to the narrow band filter and for coupling the second RF input to the narrow band filter; and f) a direct demodulator, operably coupled to the narrow band filter, for demodulating the first signal and the converted second signal.

12. The circuit of claim 11 wherein the narrow band filter has a Q value of at least approximately 1000.

13. The circuit of claim 12 wherein the narrow band filter comprises a surface acoustic wave filter.

14. The circuit of claim 11 wherein the second RF input includes a band pass filter and an RF amplifier.

15. The circuit of claim 11 wherein the direct demodulator includes a log amplifier detector.

16. The circuit of claim 11 wherein the narrow band filter has a pass band that includes the first channel frequency, wherein the first channel frequency is between 115 MHz and 140 MHz.

17. The circuit of claim 11 further comprising an antenna operably coupled to the RF input.

18. The circuit of claim 11 wherein, the frequency conversion circuit comprises first and second frequency conversion stages.

19. A method of receiving a radio frequency (RF) signal for use in a communication system leakage measurement, the communication system operable to transmit broadband communication signals comprising one or more radio frequency carrier signals modulated by one or more baseband communication signals, each radio frequency carrier signal having a channel frequency, the method comprising:

a) receiving the broadband communication signal transmitted by the communication system, the broadband communication signal including a first signal associated with a first channel frequency;

b) filtering at least a portion of the broadband communication signal to produce a filtered and unconverted first signal using a filter having a pass band that includes the first channel frequency; and c) directly demodulating the filtered and unconverted first signal to produce a baseband leakage signal.

20. The method of claim 19 further comprising a step of amplifying at least a portion of the broadband communication signal prior to executing step b).

21. The method of claim 20 further comprising the step of filtering the broadband communication signal to produce a prefiltered signal, wherein the prefiltered signal has a bandwidth of approximately 1/100th or more of the first channel frequency, the bandwidth centered approximately at the first channel frequency, and wherein the step of amplifying at least a portion of the broadband communication signal includes amplifying the prefiltered signal.

22. The method of claim 19 wherein step b) further comprises employing a surface acoustic wave filter to filter at least a portion of the broadband communication signal.

23. The method of claim 19 wherein step c) further comprises employing a log amplifier detector circuit to directly demodulate the filtered first signal.

24. The method of claim 19 wherein the broadband communication signal is a broadband CATV signal and wherein the step b) further comprises filtering at least a portion of the broadband communication signal to produced a filtered first signal such that the filtered first signal has a center frequency that is in a frequency range between 115 MHz and 140 MHz.

25. The method of claim 24 wherein step b) further comprises employing a surface acoustic wave filter to filter at least a portion of the broadband communication signal.

26. The method of claim 24 wherein step c) further comprises employing a log amplifier detector circuit to directly demodulate the filtered first signal.

* * * * *